Patented May 8, 1951

2,552,190

UNITED STATES PATENT OFFICE 2,552,190

METHOD FOR ACTIVATING CELLULOSE TO PREPARE IT FOR ESTERIFICATION

James C. Lackey, Chattanooga, and Henry G. Reed, Kingsport, Tenn., assignors to Eastman Kodak Company, Rochester, N. Y., a corporation of New Jersey No Drawing. Application February 17, 1948, Serial No. 9,025

3 Claims. (Cl. 260—229)

This invention relates to a method of preparing cellulose esters of good quality in which the cellulose is activated by treatment with a dilute solution of hypochlorite and alkali and on which the amount of liquid in contact with the cellulose is never allowed to drop below 15% of the weight of the cellulose.

Ordinarily the cellulose which is employed in the manufacture of cellulose esters is purified woodpulp, refined cotton linters, or hull fiber. In the past, dried woodpulp, either in sheeted or loose form, has only been suitable for the manufacture of certain types of cellulose esters, such as cellulose acetate and low propionyl cellulose acetate propionate. Loosely dried cotton linters and hull fiber have been employed heretofore for the manufacture of higher acyl or mixed higher acyl esters, such as cellulose butyrate or mixed acetate butyrate esters. Often a residue of the fiber is either non-esterified or only partially esterified resulting in fibers, pin-point fiber, or haze in the reaction dope after the esterification reaction. This results in cellulose esters of poor clarity. This effect is accentuated when poor grades of linters are employed.

Refined woodpulp is ordinarily marketed in the form of rolls of pulp sheet. This refined high alpha-cellulose pulp sheet material contains a small but very deleterious amount of unreactive hornified amorphous substance. This dry sheet, even after mechanical disintegration, is very difficult to completely esterify, by the ordinary commercial processes using acetic or higher fatty acids and anhydrides. Acetic acid as normally applied is a poor swelling agent for this horny solid phase in the dry cellulose sheet. The higher fatty acids are of even much less value for wetting out and initiating the esterification reaction with the anhydride. More severe esterification conditions, such as higher than normal amounts of catalyst, higher temperatures, or longer times of reaction, do not result in more complete reaction but only in more breakdown of the final cellulose esters. Such operations only yield a cellulose ester having a viscosity too low for the manufacture of desirable yarn or plastics.

One object of our invention is to provide a process of pretreating cellulose to render the cellulose readily susceptible to the action of esterification reagents. A further object of our invention is to provide a process for pretreating cellulose whereby the cellulose may be readily activated using low-cost chemicals. A further object of our invention is to provide a process for making cellulose esters of good clarity. A still further object of our invention is to provide a method for activating cellulose which renders the cellulose useful in the preparation of high butyryl cellulose esters. Other objects of our invention will appear herein.

We have found that cellulose, even though in hornified condition, can be readily activated by subjecting that material to treatment with a dilute solution of alkali and hypochlorite, followed by removal of those materials from the cellulose, providing the liquid which is in contact with the cellulose is never less than 15% of the cellulose fiber. We have found that by this method the cellulose is opened up so as to be readily susceptible to the action of the esterification reagents without any mercerization taking place. We have found that this treatment not only results in a cellulose readily susceptible to esterification but also that the color characteristics are improved so that the resulting esters are not only of good clarity but also are characterized by low color.

In its broadest aspects our invention comprises the treatment of the cellulose with water containing dissolved therein .5 to 4% of alkali, such as sodium hydroxide and hypochlorite, in an amount that there is present .1 to 1% of available chlorine. The time of treatment of the cellulose may be a value within the range of two minutes to three hours, the time of treatment depending upon the temperature which is employed for the treatment. For instance, at a temperature within the range of room temperature to 120° F., a time of 1–3 hours should be employed, whereas with a temperature of 150–200° F., a time of two to fifteen minutes is sufficient for good activation. With temperatures within the range of 120–150° F. ordinarily times of fifteen minutes to one hour will be useful. After the treatment has been applied, the hypochlorite and alkali are washed out of the cellulose, and the cellulose is then dehydrated with an organic acid, such as with glacial acetic acid or with a lower fatty acid anhydride. All the way through the pretreatment operation care should be exercised that the liquid present does not fall below 15%, based on the cellulose in order to preserve the activated condition of the cellulose. It is preferred in the pretreatment method in accordance with our invention that the cellulose after the treatment with alkali and hypochlorite be subjected to treatment, first with mineral acid prior to the water-washing operation as we have found that the use of mineral acid removes minerals from the cellulose and also results in improved color values.

In the first step of our pretreatment operation the cellulose which may be either in sheet form or in separated condition is wet with an aqueous solution of hypochlorite and alkali. The concentration of alkali should be between .5 and 4%, and within this range it is preferred to operate within the narrower range of 1 to 2%. When treating linters for obtaining extra clarity, the concentration of the alkali might go up to 4%. On the other hand, when treating pulp, one would prefer to operate below 2%. The hypochlorite should be present in an amount so that the available chlorine would be within the range of .2% and 1.0%. Either sodium or calcium hypochlorite might be employed. If desired, the hypochlorite could be formed in situ by mixing chlorine with the alkali solution so that the available chlorine and alkali concentrations would be within the ranges specified. If it is desired to operate this step at moderate temperatures, longer times would be desirable than if the step is operated at more elevated temperatures. For instance, at temperatures of 150-200° F. only a few minutes are necessary to give the desired activation to the cellulose, whereas at lower temperatures, longer times of treatment are desirable.

After the treatment, the cellulose is treated to remove the hypochlorite-alkali mixture, either by treating with mineral acid and then water-washing or by water-washing directly. If dilute mineral acid is employed for throwing the bleach and helping in the washing out of the alkali, a 4 to 8% concentration mineral acid is satisfactory. If desired, however, less acid and more solution can be employed. The water-washing should be such that the minerals are substantially removed from the cellulose whereupon the cellulose may be dehydrated by means of glacial acetic acid, in all of the operations keeping an amount of liquid of at least 15% on the cellulose. After the cellulose has been dehydrated by means of the glacial acetic acid, it is then ready to be subjected to an esterification procedure by means of fatty acid anhydride and catalyst.

The cellulose which is employed as the starting material for the activation in accordance with our invention is any of the refined high alpha-celluloses ordinarily employed in the preparation of cellulose esters. Due to the effectiveness of the activation in accordance with our invention, even some of the less highly desirable types of celluloses may be used therewith. As woodpulp ordinarily comes in the form of sheets, that type of cellulose material is particularly adapted for activation operations in accordance with our invention.

In one type of operation in accordance with our invention the cellulose in sheet form may be passed through a machine equipped with applicator rolls or spray nozzles, and the solution of alkali and hypochlorite may be applied thereto at a temperautre from room temperature to 120° F. The cellulose sheet may then be re-rolled and kept in an atmosphere having a relative humidity of at least 60 for one to three hours at a moderate temperature. After allowing to stand for this time, the sheet may then be unrolled onto a perforated endless belt passing over a series of suction boxes. At the first one or two suction boxes one or more parts of dilute mineral acid are sprayed onto the sheet and sucked through it. At the next one or two suction boxes several parts of water are applied to the cellulose sheet and sucked through. A final series of suction boxes are employed for sucking through acetic acid or other lower fatty acid in countercurrent fashion to displace substantially all of the water left in the sheet from the preceding operations. The sheet may then be passed through a picker or a breaker and into suitable containers for conveying to the esterification mixer or can be emptied directly into the mixing apparatus. The usual pretreatment of the cellulose is unnecessary, it having already been activated and esterification commenced with anhydride and catalyst.

A second mode of procedure in accordance with our invention is one wherein the sheet is led over suction boxes and the alkali-hypochlorite solution is sprayed thereon at an elevated temperature of from 150-200° F. and drawn through the sheet by means of the suction boxes. The sheet is then passed through a heating chamber having like temperatures and a relative humidity of at least 60% for a distance sufficient to consume one up to several minutes depending upon the temperature which is employed. The sheet may then be passed onto an endless belt moving at substantially the same rate of speed where it may be subjected to treatment with dilute mineral acid, water-washing and dewatering with lower fatty acid as described in the preceding paragraph. If in this arrangement the aqueous alkali-hypochlorite is applied hot, the wet sheet may be run directly onto the perforated endless belt without the benefit of the humidifying chamber. It is to be understood that in the treatments in accordance with our invention the time and temperature are somewhat related as explained previously, and adjustment of these two conditions would have to be made to obtain the desired setup for any particular type of pulp. The amount of hornified material and the difficulty of pretreating would also be a factor in deciding upon the time and temperature to employ in the treatment operations.

The activation of cellulose in accordance with our invention is for the purpose of preparing cellulose for the manufacture of lower fatty acid esters of cellulose obtained by reacting upon cellulose with lower fatty acid anhydride and catalyst. For instance, one part of cellulose is treated with three parts of lower fatty acid anhydride and 2 to 6% of concentrated sulfuric acid as the catalyst in the presence of a solvent, ordinarily lower fatty acid such as acetic acid. Ordinarily in such operations it is desirable to control the temperature of the reacting mass so that a product having a good viscosity is obtained. This activation method is particularly of value for preparing cellulose for its esterification with the more sluggish anhydrides as exemplified by propionic or butyric anhydride. Heretofore many types of cellulose were poorly suited for esterification by these anhydrides, but by means of the herein described process of activating the cellulose, all parts of the material are opened up so that the cellulose as a whole becomes readily susceptible to the esterification action of those anhydrides. Cellulose as activated in accordance with our invention is useful for the preparation of cellulose acetates, cellulose acetate propionates, cellulose acetate butyrates, cellulose propionates, and cellulose butyrates using the esterification processes as described in the prior art, except that the pretreatments there referred to are unnecessary in obtaining cellulose esters from cellulose activated in accordance with our invention.

The following example illustrates the preparation of cellulose esters utilizing our invention:

A sheet of high alpha-cellulose woodpulp was supported on a moving perforated belt or wire and was passed over a segment of suction boxes on which was sprayed a hot alkaline bleach solution containing 4% sodium hydroxide and 1% chlorine at a temperature of 160–200° F. After subjecting the pulp sheet to this solution for one to two minutes it was then passed under a spray of water containing approximately .1% sulfuric acid, thus neutralizing any alkaline liquid present in the pulp. The pulp sheet was thereupon soured by passing dilute sulfuric acid therethrough. The sheet was then washed with water, and the pulp sheet which had been so treated was then dewatered with acetic acid by means of sprays thereof and the suction boxes thereunder.

The pulp sheet which was damp with acetic acid was charged into an esterification mixer and acetylated in the usual fashion for preparing a cellulose acetate. It was found that the color of the dope so prepared is about half of that obtained from a corresponding cellulose which had not been treated. For instance, in the case of woodpulp the color of the completed product is about 120, whereas the color of the resulting product would exhibit a value of around 240. When cotton linters are treated by our method, it was found that the color of the resulting product is superior to that obtained without any preliminary treatment. For instance, an acid dope prepared from cotton linters treated in accordance with our invention has a color of 50 or 60, whereas an ester of the same cotton linters but without this treatment exhibited an acid dope color of about 120. It has been found that the plastics of cellulose esters prepared in accordance with our invention have an exceptionally low color, being reduced to 50 or 60.

We claim:

1. In a process for the manufacture of cellulose esters from dry woodpulp sheet in which the cellulose is activated and then esterified with a lower fatty acid anhydride and an acylation catalyst the activation method which comprises applying to the dry woodpulp sheet, water containing dissolved therein .5–4% of alkali, and an amount of hypochlorite sufficient to supply .1–1% of available chlorine, at a temperature of 150–250° F. for a time within the range of 2–15 minutes sufficient to activate the cellulose, removing the alkali and hypochlorite from the cellulose sheet by spraying on one side thereof with water and subjecting to suction on the other side whereby the water is drawn through the sheet, and then spraying the sheet with a fatty acid of 2–4 carbon atoms and subjecting to suction on the opposite side whereby the water in the sheet is displaced and the fatty acid is introduced therein, the proportion of liquid in the cellulose throughout the activating operation being maintained at at least 15% based on the weight of the celllose and without further liquid treatment, introducing the so-activated cellulose directly into the esterifying liquid.

2. In a process for the manufacture of cellulose esters from dry woodpulp sheet in which the cellulose is activated and then esterified with a lower fatty acid anhydride and an acylation catalyst the method which comprises treating the cellulose with water containing dissolved therein hypochlorite in an amount to supply .1 to 1% of available chlorine and .5–4% of alkali at 150–200° F. for a time within the range of 2–15 minutes sufficient to activate the cellulose, spraying the cellulose with dilute mineral acid, then with water, and then with lower fatty acid of 2–4 carbon atoms while subjecting to suction on the opposite side whereby the alkali and hypochlorite and then the water is removed from the cellulose sheet, and without further liquid treatment introducing the cellulose sheet directly into the esterifying liquid, the amount of liquid in contact with the cellulose being maintained at at least 15% based on the weight of the cellulose during the pulp-activating operation.

3. In a process for the manufacture of cellulose acetate from dry woodpulp sheet in which the cellulose is activated and then esterified with acetic anhydride and an acylation catalyst, the method which comprises applying to the dry woodpulp sheet, water containing dissolved therein .5–4% of alkali metal hydroxide and an amount of hypochlorite sufficient to supply .1–1% of available chlorine, at a temperature of 150–250° F. for a time within the range of 2–15 minutes sufficient to activate the cellulose, removing the alkali metal hydroxide and hypochlorite from the cellulose sheet by spraying on one side thereof with water and subjecting to suction on the other side, whereby the water is drawn through the sheet, and then spraying the sheet with acetic acid and subjecting to suction on the opposite side, whereby the water in the sheet is displaced and the acetic acid is introduced therein, the proportion of liquid in the cellulose throughout the activating operation being maintained at at least 15% based on the weight of the cellulose, and without further liquid treatment, introducing the so-activated cellulose directly into the esterifying liquid.

JAMES C. LACKEY.
HENRY G. REED.

REFERENCES CITED

The following references are of record in the file of this patent:

UNITED STATES PATENTS

| Number | Name | Date |
|---|---|---|
| Re. 21,935 | Goff et al. | Nov. 4, 1941 |
| 1,749,003 | Schur et al. | Mar. 4, 1930 |
| 2,112,115 | Richter | Mar. 22, 1938 |
| 2,180,517 | Goff | Nov. 21, 1939 |
| 2,389,195 | Haney et al. | Nov. 20, 1945 |
| 2,408,849 | Haney et al. | Oct. 8, 1946 |